(12) United States Patent
Caronna et al.

(10) Patent No.: US 11,186,515 B2
(45) Date of Patent: Nov. 30, 2021

(54) METHOD FOR MANUFACTURING A GLASS PREFORM FOR OPTICAL FIBERS

(71) Applicant: Prysmian S.p.A., Milan (IT)

(72) Inventors: Valeria Caronna, Salerno (IT); Stefano Grieco, Giffoni Valle Piana (IT); Irene Di Giambattista, Caserta (IT); Franco Cocchini, Salerno (IT); Antonio Schiaffo, Salerno (IT)

(73) Assignee: Prysmian S.p.A., Milan (IT)

(*) Notice: Subject to any disclaimer, the term of this patent is extended or adjusted under 35 U.S.C. 154(b) by 237 days.

(21) Appl. No.: 16/668,434

(22) Filed: Oct. 30, 2019

(65) Prior Publication Data

US 2020/0131073 A1 Apr. 30, 2020

(30) Foreign Application Priority Data

Oct. 30, 2018 (IT) .................. 102018000009920

(51) Int. Cl.
*C03B 37/014* (2006.01)
(52) U.S. Cl.
CPC .... *C03B 37/01453* (2013.01); *C03B 37/0146* (2013.01); *C03B 2201/12* (2013.01)
(58) Field of Classification Search
CPC ............. C03B 37/01453; C03B 37/0146
See application file for complete search history.

(56) References Cited

U.S. PATENT DOCUMENTS 4,586,943 A  5/1986 Kyoto et al.
4,812,155 A  3/1989 Kyoto et al.
(Continued)

FOREIGN PATENT DOCUMENTS

EP  1547981 A2  6/2005
JP  04-292433 A  10/1992
(Continued)

OTHER PUBLICATIONS

Search Report in counterpart Italian Application No. 2018000009920 dated Jul. 2, 2019, pp. 1-8.
(Continued)

*Primary Examiner* — Cynthia Szewczyk
(74) *Attorney, Agent, or Firm* — Additon, Pendleton & Witherspoon, P.A.

(57) ABSTRACT

Methods for manufacturing fluorine-doped glass preforms for optical fibers are disclosed. An exemplary method includes exposing a soot preform to an atmosphere containing a fluorine-containing gas in a first elongated chamber of a first furnace. The first elongated chamber typically has a single isothermal hot zone, which may be maintained at a doping temperature of about 800° C. to 1200° C., to obtain a fluorine-doped soot preform. The exemplary method further includes dehydrating the fluorine-doped soot preform by exposing it to an atmosphere containing a chlorine-containing gas in a second elongated chamber of a second furnace. The second elongated chamber typically has an upper hot zone, which may be maintained at a dehydration temperature of about 1000° C. to 1350° C., and a lower hot zone, which may be maintained at a consolidation temperature of about 1500° C. to 1650° C. Dehydration of the fluorine-doped soot preform typically occurs in the upper hot zone of the second furnace. The exemplary method further includes consolidating the fluorine-doped soot preform within the lower hot zone of the second furnace to form a fluorine-doped glass preform.

20 Claims, 6 Drawing Sheets

(56) References Cited

U.S. PATENT DOCUMENTS

| | | | |
|---|---|---|---|
| 4,969,941 A | 11/1990 | Kyoto et al. | |
| 5,259,856 A | 11/1993 | Ohga et al. | |
| 5,306,322 A | 4/1994 | Ishikawa et al. | |
| 6,813,907 B2 | 11/2004 | Dawes et al. | |
| 8,037,717 B2 | 10/2011 | Dawes et al. | |
| 9,878,933 B2 | 1/2018 | Heraeus | |
| 2002/0073740 A1* | 6/2002 | Dawes | C03B 37/01413 65/397 |
| 2003/0079502 A1 | 5/2003 | Dawes et al. | |
| 2003/0221459 A1 | 12/2003 | Walczak | |
| 2005/0244119 A1 | 11/2005 | Sasaki et al. | |
| 2010/0310219 A1* | 12/2010 | Bookbinder | C03B 37/01446 385/123 |
| 2014/0161406 A1 | 6/2014 | Kumano | |
| 2015/0143851 A1 | 5/2015 | Trommer et al. | |
| 2015/0143852 A1* | 5/2015 | Bookbinder | C03B 37/01453 65/397 |
| 2016/0016839 A1* | 1/2016 | Schwerin | C03B 23/045 501/54 |
| 2017/0362115 A1* | 12/2017 | Dawes | C03B 19/1461 |
| 2018/0282199 A1 | 10/2018 | Cocchini et al. | |

FOREIGN PATENT DOCUMENTS

| | | |
|---|---|---|
| WO | 2002/049977 A2 | 6/2002 |
| WO | 2017/059928 A1 | 4/2017 |

OTHER PUBLICATIONS

Extended European Search Report in counterpart European Application No. 19204864.3 dated Mar. 10, 2020, pp. 1-5.

\* cited by examiner

METHOD FOR MANUFACTURING A GLASS PREFORM FOR OPTICAL FIBERS

CROSS-REFERENCE TO PRIORITY APPLICATION

This application claims the benefit of pending Italian Application No. 102018000009920 (filed Oct. 30, 2018, at the Italian Patent and Trademark Office), which is hereby incorporated by reference in its entirety.

FIELD OF THE INVENTION

The present disclosure relates to a method of manufacturing a glass preform for optical fibers. For example, the present disclosure concerns a method of manufacturing a silica-based glass preform (e.g., a glass core preform) to produce an optical fiber comprising a fluorine-doped region.

BACKGROUND

Silica-based glass preforms for drawing optical fibers, in particular telecommunication optical fibers, can be produced from a soot preform according to well-known manufacturing methods, such as outside vapor deposition (OVD) and vapor axial deposition (VAD). The soot preform is a porous precursor body generally cylindrical in shape and made fully or partially by soot particles with a density typically not exceeding 0.7 $g/cm^3$, thus significantly lower than the density of silica glass of about 2.2 $g/cm^3$. The deposited silica soot can be doped with elements, such as germanium and fluorine, for raising or lowering the refractive index of the undoped silica to produce layers of differing refractive indices.

Soot preforms, either whole porous or partially porous, are subsequently treated with a drying agent and then consolidated inside a furnace into a dense glass preform at temperatures higher than the glass transition temperature. Drying is performed by heating the preform to a typical temperature of about 1100° C. in the presence of one or more drying gases, such as a mixture of helium and chlorine. Consolidation is performed by heating the dried preform typically to a temperature of 1500° C. or higher. In processes commonly used for dehydration and consolidation, a soot preform is inserted into a furnace comprising a cylindrically-shaped muffle tube. The preform is then pulled out as a transparent silica glass preform from the furnace after consolidation. Given that dehydration and consolidation take place at different temperatures, the furnace is often configured to have different hot zones along the muffle tube for the drying and the consolidation phases. In some furnaces, during consolidation, the preform is lowered through a hot zone set at a higher temperature.

To reduce the bending loss of optical signals transmitted through the optical fibers, the refractive index profile can be suitably shaped by doping a region surrounding the fiber core region. In optical fibers with a core region made of silica doped with a doping element that increases the refractive index, such as germanium, fluorine is a commonly used dopant for lowering the refractive index and creating a trench (namely, a depressed refractive index region) that surrounds the core region.

A method for producing a quartz glass preform with fluorine incorporated therein is described in U.S. Pat. No. 4,812,155, which is hereby incorporated by reference in its entirety.

International Publication No. WO 2002/049977, which is hereby incorporated by reference in its entirety, relates to the manufacturing of a preform having a fluorine-doped region.

A manufacturing process of a glass core preform in which fluorine doping is carried out by fluorinating a soot core preform comprising a central hole extending axially therethrough is described in International Publication No. WO 2017/059928, which is hereby incorporated by reference in its entirety. The method comprises a first step of simultaneously dehydrating and doping with fluorine the soot core preform at a temperature of from 1000° C. to 1350° C. by exposing it to an atmosphere containing a chlorine-containing gas and a fluorine-containing gas, and a second step of simultaneously consolidating the soot core preform and closing the central longitudinal hole by exposing the soot core preform to an atmosphere substantially devoid of fluorine and of chlorine at a consolidation temperature of from 1500° C. to 1650° C. while reducing the pressure down the central longitudinal hole, thereby forming a glass core preform.

U.S. Pat. No. 6,813,907, which is hereby incorporated by reference in its entirety, discloses a method of doping an optical fiber preform by reacting a fluorine containing precursor in a flame of a combustion burner, wherein the precursors reacted in the flame are substantially devoid of the element of silicon, thereby forming a fluorine-containing atmosphere for the doping of a soot preform. The method allows the production of a fluorine-doped soot preform that is doped during deposition. A described advantage is that the optical fiber may be formed with a minimal number of transfer steps.

U.S. Pat. No. 9,878,933, which is hereby incorporated by reference in its entirety, relates to a method for the manufacture of a fluorine-doped glass from a soot body, the method comprising a) providing a soot body with a mean density of 18-30% relative to the quartz glass; b) treating a soot body with a gaseous fluorine-containing compound at a temperature from 700° C. to 1000° C. to form an intermediate product of relative mean density of maximally 30%; c) heating the fluorinated intermediate product in the absence of chlorine at a temperature from 950° C. to 1150° C. to increase its mean density to a relative value of 40-80%; and d) vitrifying an intermediate product in a chamber at a pressure lower than the ambient pressure. In an exemplary embodiment, vitrification of step d) takes place in a different chamber from the chamber in which steps b) and c) are performed.

Muffle tubes for the production of glass preforms of transmission optical fibers are commonly made of highly pure quartz to avoid contamination of the soot preform with impurities at the high temperatures used during dehydration and/or consolidation process. At high temperatures, fluorine-containing gas is known to decompose or react to form $F_2$ gas and/or HF gas. These gases react with the quartz glass causing etching of its surface, which may lead to the formation of pits in the muffle tube and/or to a continuous reduction of the tube wall thickness.

U.S. Pat. No. 4,969,941, which is hereby incorporated by reference in its entirety, tackles the problem of the appearance of transition metals such as copper or iron on the surface of the quartz glass because of the etching, the metals being a source of contamination for the porous preform. The patent describes a heating furnace for heating a porous preform in an atmosphere comprising a fluorine-containing atmosphere to add fluorine to the preform and to vitrify the preform to produce a glass preform for an optical fiber, the furnace comprising a muffle tube having an inner layer made of highly pure carbon and an outer layer made of silicon carbide.

U.S. Pat. No. 5,259,856, which is hereby incorporated by reference in its entirety, discloses a method of thermally treating a glass preform for an optical fiber in a muffle tube to prevent corrosion by a fluorine-containing compound and a chlorine-containing compound, wherein the muffle tube is positioned inside a heater to separate a heating atmosphere inside the muffle tube from the heater and the muffle tube body consists of highly pure carbon, and an inner wall and an outer wall of the body being coated with a carbon material selected from the group consisting of pyrolytic graphite and solid-phase carbonized glassy carbon, the carbon material being unreactive with $SiCl_4$.

U.S. Pat. No. 5,306,322, which is hereby incorporated by reference in its entirety, relates to a process for a dehydrating and purifying treatment by heating a porous glass preform for an optical fiber comprising supporting or passing the preform in or through a muffle tube having a SiC layer at least on its inner surface at a high temperature under an atmosphere comprising an inert gas and a silicon halogenide gas or an atmosphere comprising an inert gas, a silicon halogenide gas, and a halogen based gas.

Fluorine doping of a cladding layer of a preform by employing $SiF_4$ and $O_2$ in a quartz muffle is disclosed in Japanese Publication No. H04 292433. A quartz tube is inserted through an opening of the muffle.

SUMMARY

In an exemplary aspect, the present invention embraces improved methods for manufacturing fluorine-doped glass preforms for optical fibers (i.e., optical-fiber preforms). By way of introduction, an exemplary method includes exposing a soot preform to an atmosphere containing a fluorine-containing gas in a first elongated chamber of a first furnace. The first elongated chamber typically has a single isothermal hot zone, which may be maintained at a doping temperature of about 800° C. to 1200° C., to obtain a fluorine-doped soot preform. The exemplary method further includes dehydrating the fluorine-doped soot preform by exposing it to an atmosphere containing a chlorine-containing gas in a second elongated chamber of a second furnace. The second elongated chamber typically has an upper hot zone, which may be maintained at a dehydration temperature of about 1000° C. to 1350° C., and a lower hot zone, which may be maintained at a consolidation temperature of about 1500° C. to 1650° C. Dehydration of the fluorine-doped soot preform typically occurs in the upper hot zone of the second furnace. The exemplary method further includes consolidating the fluorine-doped soot preform within the lower hot zone of the second furnace to form a fluorine-doped glass preform.

Implementations of the processes employing a furnace with a muffle tube designed according to the solutions described in U.S. Pat. Nos. 4,969,941, 5,259,856, and 5,306,322 are complex.

The presence of pits in the muffle tube and/or a continuous reduction of the tube wall thickness lead to the creation of leakages or holes, which allow the introduction in the muffle tube of external air and/or —OH radicals. Deterioration of the quartz muffle tube results in the fabrication of optical fibers with high optical attenuation.

Average lifetime of a quartz muffle tube in general depends on the amount of fluorine-containing gases employed and the average time duration of the doping phases.

To ensure that the quality of the optical fibers remains at a level required by the common ITU-T Recommendations for optical communications, the furnace needs to be switched off, cooled down, then the damaged quartz tube has to be removed and a new muffle tube installed in the furnace. These lengthy operations adversely affect the production yield and increase costs. Furthermore, quartz tube replacement is particularly costly, especially in case of relatively long tubes designed for two or more heating zones.

In a furnace configured to have zones along the muffle tube set at different temperatures, namely a relatively low temperature zone for dehydration and a relatively high temperature zone for consolidation, an axial thermal gradient is created along the muffle tube. The two heating zones are typically arranged one above the other and sufficiently near to one another that a preform positioned at the low-temperature zone may experience a temperature higher than the dehydration temperature. The inventors have observed that the lifetime of a muffle tube exposed to a fluorine-containing gas is significantly shortened when the furnace has been used for processes involving heating in the presence of a fluorine-containing gas at temperatures of about 1200° C., in particular higher than 1300° C.

FIG. 1 is a schematic side view of a furnace for dehydration and consolidation of a soot preform, according to a typical construction, with some parts shown in cross-sectional view to better highlight some details. A soot preform 9 is processed in a furnace 10. The furnace 10 comprises a vertical muffle tube 12, which is configured to house an elongated preform. The muffle tube, typically made of quartz and of generally cylindrical shape, is vertically oriented so that the furnace's longitudinal axis is parallel to a downfeed direction for the translational movement of the preform 9 along the muffle tube 12. The muffle tube 12 has a lateral wall 19 with an inner surface and a basement 15 and a lid 21 closing, respectfully, the bottom and the top of the muffle tube. The furnace 10 is connected to a gas delivery system (not shown) through one or more gas inlet ports 16 for the supply of process gases, which are discharged from a gas outlet port 17. In the configuration shown in FIG. 1, gases are fed from the bottom of the furnace through the gas inlet port 16 and discharged from the top through the gas outlet port 17. Gas inlet port 16 is provided as a through-hole in the basement 15, and gas outlet port 17 is provided as a through-hole in the lid 21. It is to be understood that location of the inlet and outlet ports 16, 17 are purely exemplary. When gases are fed in the muffle tube, the outer surface of the soot preform 9 is exposed to an atmosphere containing those gases, which can diffuse across the porous structure of the soot. Inlet and outlet gas flows are symbolized with arrows 23.

The furnace 10 comprises a first heater 13 arranged peripherally, in particular surrounding, the muffle tube 12. The first heater 13 defines a first hot zone set at a first temperature suitable for dehydration of the porous layers of the preform, for example from 1000° C. to 1350° C. A second heater 14, which is positioned below the first heater 13, is arranged peripherally, in particular surrounds, the muffle tube 12. The second heater 14 defines a second heating zone set at a second temperature for consolidation of the porous preform into a solid glass preform, for example at 1500° C. The soot preform may remain stationary in the first heating zone for dehydration and then may be moved down toward the second heating zone for consolidation.

When fluorine doping is carried out simultaneously to dehydration, fluorine-containing gas and chlorine-containing gas are fed from the gas inlet port 16 together with a carrier gas, such as helium. If dehydration follows a process step of fluorine doping, first a fluorine-containing gas and then a chlorine-containing gas are fed in the muffle tube. If fluorine-doping takes place simultaneously to dehydration, both a fluorine-containing gas and a chlorine-containing gas are fed in the muffle tube. The inventors have observed that, upon usage of the furnace, a highly damaged region, represented as dotted region 20 in FIG. 1, is present on the inner surface of the muffle tube wall 19 at a lower portion of the second hot zone that is set at higher temperatures.

The inventors have understood that keeping the fluorine-doping process separate from the dehydration and/or consolidation process allows carrying out the fluorine doping at a temperature that can be conveniently selected. In particular, the inventors have realized that carrying out the fluorine-doping process in an elongated chamber of a furnace having a single isothermal zone kept at a temperature not higher than 1200° C., typically not higher than 1100° C., increases the lifetime of the elongated chamber. According to a main feature of the present disclosure, fluorine doping is carried out in a first elongated chamber of a first furnace having a single isothermal zone kept at a doping temperature less than or equal to 1200° C. to be followed by a dehydration process and then a consolidation process in a second elongated chamber of a second furnace having an upper hot zone and a lower hot zone set at distinct temperatures.

Fluorine doping is carried out by exposing a soot preform to an atmosphere containing a fluorine-containing gas, which can penetrate across the porous structure of the soot.

Consistently with the present disclosure, an exemplary method for manufacturing a core preform for optical fibers comprises: exposing a soot preform to an atmosphere containing a fluorine-containing gas (and optionally being substantially devoid of chlorine) in a first elongated chamber of a first furnace, the first elongated chamber having a single isothermal hot zone kept at a doping temperature of from 800° C. to 1200° C. to obtain a fluorine-doped soot preform; dehydrating the fluorine-doped soot preform by exposing it to an atmosphere containing a chlorine-containing gas and being substantially devoid of fluorine in a second elongated chamber of a second furnace, the second elongated chamber having an upper hot zone at a dehydration temperature of from 1000° C. to 1350° C. and a lower hot zone at a consolidation temperature of from 1500° C. to 1650° C., wherein dehydration takes place in the upper hot zone of the second furnace; and consolidating the fluorine-doped soot preform by moving it down into the lower hot zone of the second furnace so as to form a fluorine-doped glass preform.

Avoiding exposing the second elongated chamber to a fluorine-containing atmosphere significantly increases the lifetime of the muffle tube of the second furnace.

Advantageously, the fluorine-doping process can be performed in a furnace with a simplified design, in particular a furnace comprising a single heater. This significantly decreases the costs for the muffle tube substitution.

Typically, no zone of the first elongated chamber is at a temperature higher than the doping temperature. This can be achieved by a furnace having a single hot zone created in the first elongated chamber during the fluorine-doping process.

Typically, the first elongated chamber is made of quartz.

Typically, the second elongated chamber is made of quartz.

Typically, the doping temperature is of from 900° C. to 1100° C. In an exemplary embodiment, the doping temperature is about 1000° C.

The soot preform may be a silica-based soot core preform. The silica-based soot core preform may comprise an inner central region of silica soot doped with a refractive index increasing dopant (e.g. Ge) and an outer region of undoped silica soot.

Moving down the fluorine-doped soot preform may comprise gradually lowering the preform through the lower hot zone. Typically, gradually lowering the preform through the lower hot zone is carried out until the whole preform has passed through the lower hot zone so as to form a fluorine-doped glass preform.

Typically, consolidating comprises exposing the fluorine-doped soot preform to an atmosphere substantially devoid of both fluorine and chlorine.

With "substantially devoid of chlorine," it is meant in the present description and claims an atmosphere having no intentionally added chlorine. Analogously, with "substantially devoid of fluorine," it is meant an atmosphere having no intentionally added fluorine.

The fluorine-containing gas may be a fluorocarbon gas and/or a sulfur/sulfuryl fluoride gas.

The fluorine-containing gas may contain a gaseous compound selected from the group consisting of $SiF_4$, $SF_6$, $CF_4$, and $C_2F_6$, or combinations thereof.

The atmosphere comprising a fluorine-containing gas may comprise an inert gas as carrier gas, typically helium. In an exemplary embodiment, the fluorine-containing gas is a mixture of $SF_6$ and helium.

The first elongated chamber may have a vertical length larger than the length of the soot preform to be processed so that the whole soot preform is isothermally heated at the doping temperature during exposure of the soot preform to an atmosphere containing a fluorine-containing gas (and typically being substantially devoid of chlorine). The soot preform may remain stationary with respect to the vertical direction of the first elongated chamber during exposure to an atmosphere containing a fluorine-containing gas.

The second elongated chamber of the second furnace may be a second muffle tube of generally cylindrical shape arranged vertically, and the second furnace may comprise an upper heater defining the upper hot zone and a lower heater defining the lower hot zone, wherein the lower heater is positioned below the upper heater (with respect to a vertical direction) and the upper heater and the lower heater are arranged peripherally to the second muffle tube.

The first elongated chamber may comprise a gas inlet port for feeding the fluorine-containing gas and a gas outlet port for the discharge of gases fed from the gas inlet port. The gas outlet port may be positioned, in a vertical direction, above the heater, in particular at the top of the first elongated chamber.

The first elongated chamber may comprise a heater arranged peripherally to the first elongated chamber and defining the single isothermal zone.

In exemplary embodiments, the first elongated chamber is a first muffle tube of generally cylindrical shape arranged vertically and the first furnace comprises a heater arranged peripherally to the first muffle tube, in particular arranged around the first muffle tube.

The gas inlet port may be positioned above the heater of the first furnace. The first furnace may comprise a gas inlet port positioned above the heater (in a vertical direction) and an inner pipe having an inlet end opening and an outlet end opening, the inner pipe being fluidly connected to the gas inlet port through its inlet end opening. The inner pipe may extend vertically downward inside the first muffle tube for guiding the fluorine-containing gas to a lower portion of the first muffle tube, and exposing a soot preform to an atmosphere containing a fluorine-containing gas may comprise feeding the fluorine-containing gas into the inner pipe through the gas inlet port to the outlet end opening for the outlet gas flow. The inner pipe may be made of quartz. The inner pipe may have an inner diameter of from 4 millimeters to 8 millimeters.

The heater of the first muffle tube may extend vertically for a heater length and the inner pipe may extend vertically at least throughout the heater length. The inner pipe may extend throughout the heater length and downward from the heater so that the outlet end opening of the inner pipe is positioned relatively lower than the heater. Guidance of the gas flow in the inner pipe through the hot zone of the furnace preheats the gas flow and prevents the soot preform from being cooled by the fluorine containing gas.

The inner pipe extending vertically downward from the heater may comprise a curved end portion ending with the outlet end opening facing upward. The curved end portion may have a U-shape. In this way, gas flowing out the inner pipe is directed upstream toward the soot preform.

In particular, the present disclosure relates to a manufacturing process of a glass core preform in which fluorine doping is carried out by fluorinating a soot core preform. The soot core preform may be obtained by outside vapor deposition (OVD).

The soot core preform may have a central longitudinal hole extending axially therethrough and consolidating the fluorine-doped soot preform comprises simultaneously consolidating the fluorine-doped soot core preform and closing its central longitudinal hole by exposing the soot core preform to an atmosphere substantially devoid of both fluorine and chlorine ((e.g., both fluorine and chlorine concentrations are typically kept low during consolidation of the soot preform), while reducing the pressure down the central longitudinal hole, thereby forming a glass core preform.

A method for manufacturing an optical fiber is described, the method comprising: manufacturing a glass core preform by a method according the present disclosure; stretching the glass core preform to reduce its outer diameter thereby forming at least one glass core rod; overcladding the glass core rod to form an optical fiber preform formed by the glass core rod surrounded by a glass overclad layer; and drawing the optical fiber preform to produce an optical fiber.

The foregoing illustrative summary, as well as other exemplary objectives, properties, and/or advantages of the invention, and the manner in which the same are accomplished, are further explained within the following detailed description and its accompanying drawings.

BRIEF DESCRIPTION OF THE DRAWINGS

The present disclosure will be now described more fully hereinafter with reference to the accompanying drawings, in which some, but not all embodiments of the invention are shown. The drawings are provided as examples, may be schematic, and may not be drawn to scale. The present inventive aspects may be embodied in many different forms and should not be construed as limited to the examples depicted in the drawings.

For the purpose of the present description and of the appended claims, except where otherwise indicated, all numbers expressing amounts, quantities, percentages, and so forth, are to be understood as being modified in all instances by the term "about." Also, all ranges include the maximum and minimum points disclosed and include any intermediate ranges therein, which may or may not be specifically enumerated herein.

DETAILED DESCRIPTION

In exemplary embodiments, the glass preform to be obtained by the method consistent with the present disclosure is used for the manufacturing of a single-mode optical fiber suitable for optical transmission systems, in particular for a bend-resistant single-mode optical fiber.

Typically, the soot preform is made of a silica-based material for the production of a silica-based optical fiber.

The exemplary embodiments described in the following disclosure refer in particular to the manufacturing of a glass core preform for the production of a glass preform to be drawn into an optical fiber. However, it is to be understood that the method of the present disclosure can be applied to any soot preform, such as a fully porous soot preform or a partially porous soot preform, such as a preform constituted by a core rod surrounded by a soot layer.

The glass core preform is doped with fluorine. Typically, the glass core preform produced by the method according to the present disclosure has a refractive index profile comprising a trench, namely a depressed-index region, which is positioned outwardly from a core region. Typically, the core region is made of silica doped with a doping element that increases the refractive index, such as germanium.

The glass core preform can be obtained from a soot preform formed using a flame hydrolysis deposition process, typically by an OVD process. In the OVD process, a longitudinal mandrel, generally tapered to ease removal and made of alumina or other ceramic material, is secured to a handle at one of its ends, which will be referred to as preform handle. As it is generally known, during OVD deposition, soot outwardly fills a longitudinal portion of the preform handle making it integral with the soot core preform and for that reason it is indicated also as core integral handle. After completion of the deposition process, the mandrel is removed from the soot preform leaving a central hole along the longitudinal axis of the soot preform. In accordance with the present disclosure, the soot preform is subject to a process of fluorine doping of the soot in a first furnace and then to a dehydration process followed by a consolidation process in order to form a glass core preform in a second furnace.

Figure 2:
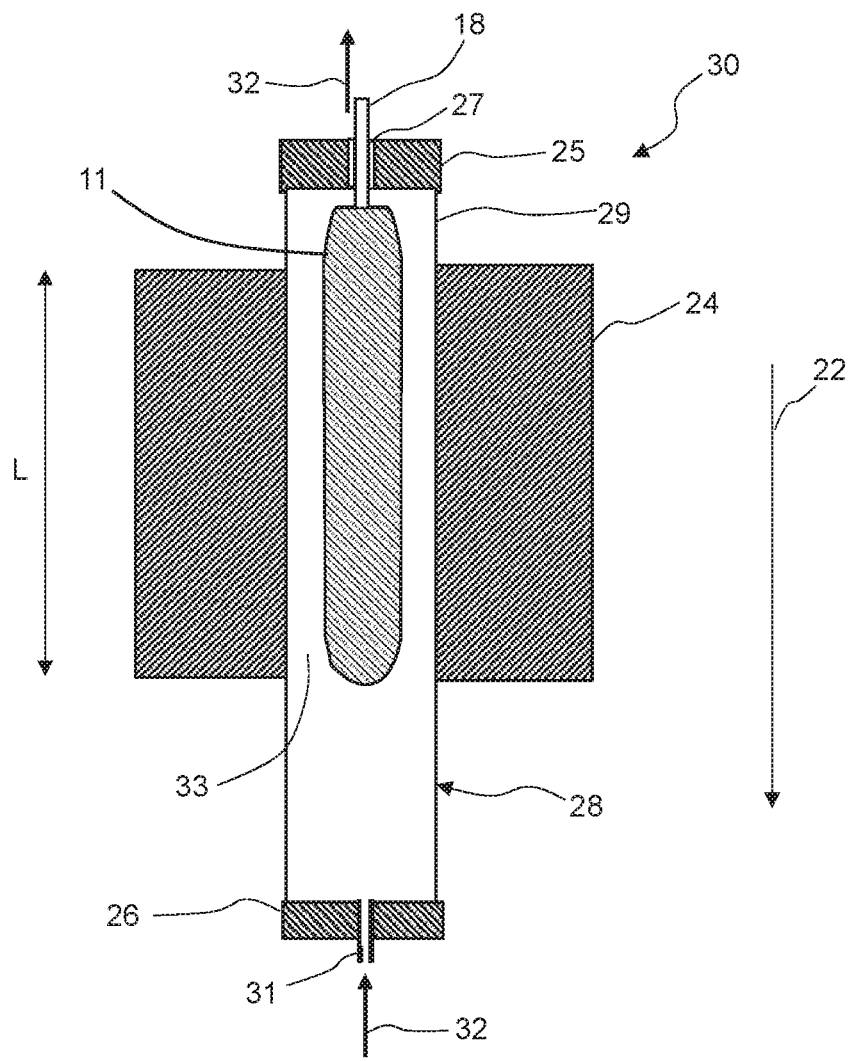
FIG. 2 is a schematic side view of a furnace for fluorine doping of a soot preform, according to a first embodiment of the present disclosure.

FIG. 2 is a side view of a furnace for fluorine doping of a soot preform with some parts shown in cross-sectional view to better highlight some details, in accordance with an exemplary embodiment consistent with the present disclosure. A soot preform 11 is inserted in a first furnace 30 for a fluorine-doping process. The soot preform 11 is provided at one of its ends with a preform handle 18. The first furnace 30 comprises a first elongated chamber 28 configured to house an elongated preform and a heater 24 arranged peripherally of the first elongated chamber 28. In the described embodiments, the first elongated chamber 28 is a vertical muffle tube, typically made of quartz and of generally cylindrical shape. The muffle tube 28 extends along a longitudinal direction and it is vertically oriented so that its longitudinal axis is parallel to a direction for the translational movement (arrow 22) of the soot preform 11 along the muffle tube 28. The muffle tube 28 has a lateral wall 29 with an inner surface.

In this exemplary embodiment, the muffle tube 28 is open-ended at the bottom and at the top, the bottom being closed by a basement 26. A lid 25 closes the top opening of the muffle tube 28 and is provided with a through-hole 27 for the insertion of the preform handle 18 and, as described more in detail herein, for the discharge of gases.

In ways known per se, the soot preform 11 is suspended by a conventional translational downfeed system (not shown), typically comprising a support handle (not shown) to be connected to the top part of the preform handle 18. The downfeed system imparts to the support handle a translational movement up and down along the vertical direction 22 along the muffle tube 28. This facilitates insertion and removal of the preform into and out of the muffle tube. Typically, a rotation about a longitudinal axis parallel to the downfeed direction is imparted to the soot preform 11 during the fluorine-doping process. Consequently, the preform can move down (and up) in the muffle tube and can rotate about its longitudinal axis.

During the fluorine doping phase, the first furnace 30 has a single hot zone 33 extending vertically along the longitudinal direction of the muffle tube 28 over a length that approximately corresponds to the length L of heater 24. The heater is set at a constant temperature Tf to provide an isothermal hot zone. The temperature Tf is indicated in the present description and appended claims as doping temperature.

Typically, the heater 24 is arranged around the muffle tube 28. Typically, the heater 24 has a ring shape, which may comprise one or more annular heating elements set at the same temperature Tf. Typically, the first furnace 30 comprises a single heater 24.

In ways known per se, the temperature of the single hot zone 33 is kept constant by a temperature control system that senses the temperature in the muffle tube 28, for example by a temperature sensor, and, where necessary, regulates the temperature of the heating elements.

Within the present description and claims, with "constant temperature," it is meant that temperature fluctuations about the selected temperature value, taken as middle point, is of ±20° C. (e.g., ±10° C.). Analogously, with "isothermal hot zone," it is meant a heated zone having a uniform temperature set at a constant value, defined as above (i.e., ±20° C.)

Typically, the doping temperature is in the range of from 800° C. to 1200° C., more typically of from 900° C. to 1100° C.

Typically, the soot preform 11 is maintained at a temperature that does not induce a significant increase of density (i.e. a densification) of the soot, at least for heating times less than two hours. In this way, after the fluorine-doping process in the first furnace 30, the soot preform is substantially devoid of any sintered glass layer.

Consistently with the present disclosure, the soot preform 11 is doped with fluorine in the first furnace, while the soot preform is isothermally heated, by exposing it to an atmosphere containing a fluorine-containing gas. Typically, no zone of the first muffle tube is at a temperature higher than the doping temperature during exposure of the soot preform to an atmosphere containing a fluorine-containing gas.

The furnace 30 comprises a gas inlet port 31 that can be connected to a gas delivery system (not shown) for the supply of processing gases, in particular a fluorine-containing gas. The gas inlet port 31 can be provided as a through-hole in the basement 26 connected to the gas delivery system via a duct (not shown). In the exemplary embodiment of FIG. 2, gases are fed from the bottom of the furnace 30 and flow upwardly through the muffle tube 28 to be discharged from the top of the muffle tube through the through-hole 27 working as a gas outlet port. When gases are fed into the muffle tube, the outer surface of the soot preform 11 is exposed to an atmosphere containing those gases, which can diffuse across the porous structure of the soot. Inlet and outlet gas flows are symbolized with arrows 32. Typically, the atmosphere comprising a fluorine-containing gas comprises an inert gas as carrier gas. Typically, the inert gas is helium.

In an exemplary embodiment, the soot preform 11 remains stationary with respect to the vertical direction 22 of the muffle tube 28, in correspondence to the isothermal hot zone 33, during the fluorine-doping process. The soot preform may rotate to attain axial symmetry of the fluorine doping.

In another exemplary embodiment, the isothermal hot zone 33 may be shorter than the processed soot preforms and the preform is moved down through the heater 24 at a given rate, which can be selected to be suitable to attain uniform soot fluorination.

Figure 3:
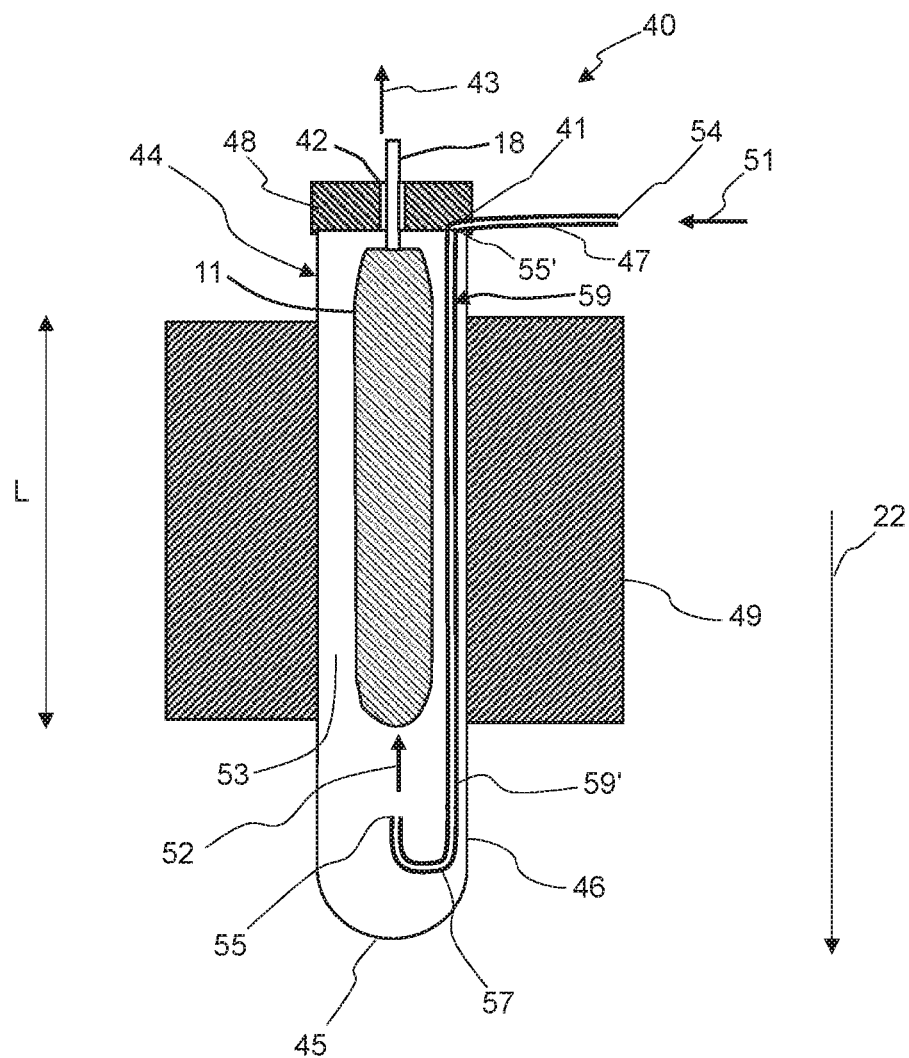
FIG. 3 is a schematic side view of a furnace for fluorine doping of a soot preform, according to a second embodiment of the present disclosure.

FIG. 3 is a side view of a furnace for fluorine doping of a soot preform with some parts shown in cross-sectional view to better highlight some details, in accordance with a further embodiment consistent with the present disclosure. A soot preform 11 is inserted in a first furnace 40 for a fluorine-doping process. The first furnace 40 comprises an elongated chamber 44 configured to house an elongated preform and a heater 49 arranged peripherally of the first elongated chamber 44. The first elongated chamber 44 is a vertical muffle tube of generally cylindrical shape, typically made of quartz. The muffle tube 44 extends along a longitudinal direction and it is vertically oriented. The muffle tube 44 has a lateral wall 46 with an inner surface. In this exemplary embodiment, the muffle tube has a round closed bottom 45 and a top opening closed by a lid 48. The lid 48 is provided with a through-hole 42 through which the preform handle 18 is inserted to be connected to a vertical translational downfeed system (not shown). The closed bottom 45 of the muffle tube 44 may have a different shape.

Typically, the heater 49 is arranged around the lateral wall 46 of the muffle tube 44. The heater 49 can be ring-shaped and surround the lateral wall 46 of the muffle tube. The heater can comprise one or more heating elements set at a uniform doping temperature.

The first furnace 40 has a single hot zone 53 extending vertically along the longitudinal direction of the muffle tube 44 (vertical direction 22) over a length that approximately corresponds to the length L of the heater 49. The heater is set at a constant temperature Tf to provide an isothermal hot zone 53.

The length of the isothermal hot zone 33 is typically selected to be at least equal to the length of the processed preforms.

The furnace 40 comprises a gas inlet port 41 that can be connected to a gas delivery system (not shown) for the supply of processing gases, in particular a fluorine-containing gas. Gas inlet flow is symbolized by arrow 51. The gas inlet port 41 is typically positioned above the heater 49 so that gas flows in from the top of the muffle tube. In the exemplary embodiment shown in FIG. 3, the gas inlet port 41 is positioned above the muffle tube 44, in particular in the lid 48 closing the top opening of the muffle tube, wherein the lid 48 comprises an aperture formed therein for the feeding of the gas. In an exemplary embodiment not shown in FIG. 3, the gas inlet port can be located in an upper portion of the lateral wall 46 of the muffle tube 44, above the heater 49.

An inner pipe 59 arranged inside the muffle tube 44 is fluidly connected to the gas inlet port 41 to receive the in-flow gas. The inner pipe 59 is arranged to extend vertically downward in the muffle tube 44 for guiding the inlet gas flow to a lower portion of the muffle tube 44. Typically, the inner pipe 59 is arranged peripherally in the muffle tube, more typically in the proximity of the inner surface of the lateral wall 46 of the muffle tube 44 in order not to come into contact with the preform 11 and/or not to interfere with the movement of the preform 11. The inner pipe 59 has an inlet end opening 55' for the gas in-flow and an outlet end opening 55 for the outlet gas flow. The outlet gas flow is symbolized in FIG. 3 by arrow 52.

Typically, the inner pipe 59 extends vertically at least throughout the length L of the heater 49. More typically, the inner pipe 59 extends downward from the heater 49 so as a lower portion 59' of the inner pipe extends below the heater 49 (e.g., vertically positioned lower than the heater 49 as depicted in FIG. 3) and, when a preform 11 is placed in the muffle tube 44, the outlet end opening 55 is positioned under the preform (and the heater).

Consistently with this exemplary embodiment, gases are fed from the top of the furnace 40 and are guided by the inner pipe 59 downward, typically below and then around the soot preform 11 so that soot preform 11 is exposed to an atmosphere containing those gases, which can diffuse across the porous structure of the soot. Gas flow is discharged from the top of the muffle tube 44 through a gas outlet port. In the exemplary embodiment shown in FIG. 3, the gas outlet port is the through-hole 42 of lid 48. Outlet gas flow is symbolized with arrow 43.

In the particular embodiment shown in FIG. 3, the lower portion 59' of the inner pipe 59 comprises a curved end portion 57 ending with the outlet end opening 55 facing upward. Typically, the curved end portion 57 has a U-shape. In this way, gas flowing out the inner pipe 59 is directed upstream toward the preform 11.

Other configurations of the inner pipe 59 may be envisaged for the vertical guidance of the inlet gas flow downward the muffle tube.

In the present embodiment, typically, the preform 11 remains stationary during the fluorine-doping process.

In the exemplary embodiment of FIG. 3, the furnace 40 comprises an inlet pipe 47 arranged in the muffle tube 44 and comprising an inlet end opening 54. The inlet pipe 47 passes through the aperture of the gas inlet port 41, as schematically shown in FIG. 3, so gas inlet flow is received from the inlet end opening of the inlet pipe 47 (connected to the gas delivery system) and passes through the gas inlet port 41. The inner pipe 59 can be integral to the inlet pipe 47 or be connected to the inlet pipe 47 either directly or through the through-aperture of the gas inlet port 41.

The inner pipe 59 is typically made of quartz.

Typically, the inner pipe 59 has an inner diameter of from 4 millimeters to 8 millimeters. Guidance of the gas flow through the hot zone 53 of the muffle tube 44 preheats the gas to reduce or prevent cooling of the soot preform due to the flowing of the fluorine-containing gas through the soot.

The fluorine-containing gas is typically $SiF_4$, $SF_6$, $CF_4$, and/or $C_2F_6$. In an exemplary embodiment, the fluorine-containing gas is $SF_6$.

The atmosphere containing a fluorine-containing gas is usually substantially devoid of chlorine. Typically, chlorine concentrations during doping of the soot preform are less than about 1 percent by volume. Typically, the atmosphere comprising a fluorine-containing gas comprises an inert gas as carrier gas. Typically, the inert gas is helium.

Typically, helium gas flows along the soot preform during exposure to an atmosphere containing a fluorine-containing gas at a flow rate of from 5 l/min to 80 l/min.

Typically, the flow rate of the fluorine-containing gas during the fluorine-doping process is of from 5 l/min to 20 l/min.

In an exemplary embodiment, the atmosphere is a gas mixture of $SF_6$ and helium.

The inventors have observed that an effective fluorine doping of the soot preform can be attained with relatively short processing times. Typically, the soot preform is maintained at the doping temperature Tf for a doping time of from 20 minutes to 120 minutes, such as from 30 min to 90 min. In general, doping time may depend on the external radius of the soot preform and on the radial depth of fluorine diffusion across the soot. In some examples, the outer diameter of the soot preform is of from 100 millimeters to 200 millimeters.

Following the fluorine-doping process, the fluorine-doped soot preform 11 is extracted from the first furnace (30 or 40) and transferred to a dehydration and consolidation furnace, indicated as second furnace. The second furnace comprises a second elongated chamber having an upper hot zone and a lower hot zone.

Figure 1:
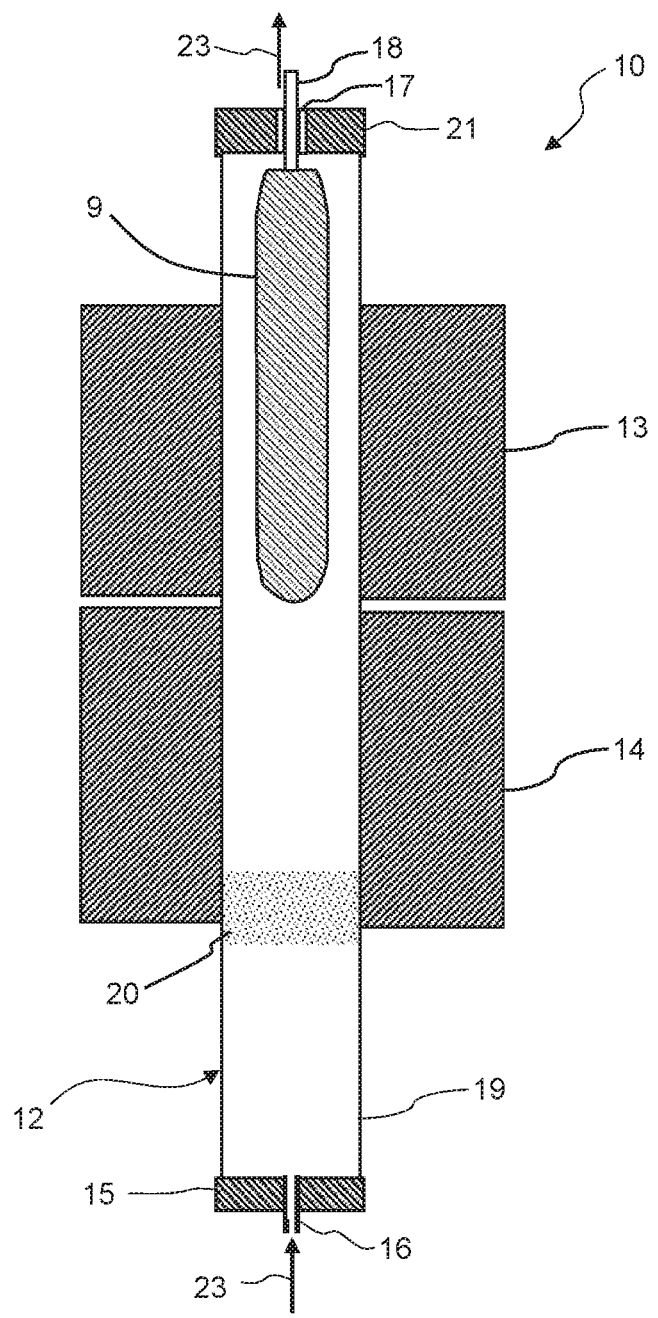
FIG. 1 is a schematic side view of a furnace for dehydration and consolidation of a soot preform with some parts shown in cross-sectional view to better highlight some details of the apparatus.
Figure 4:
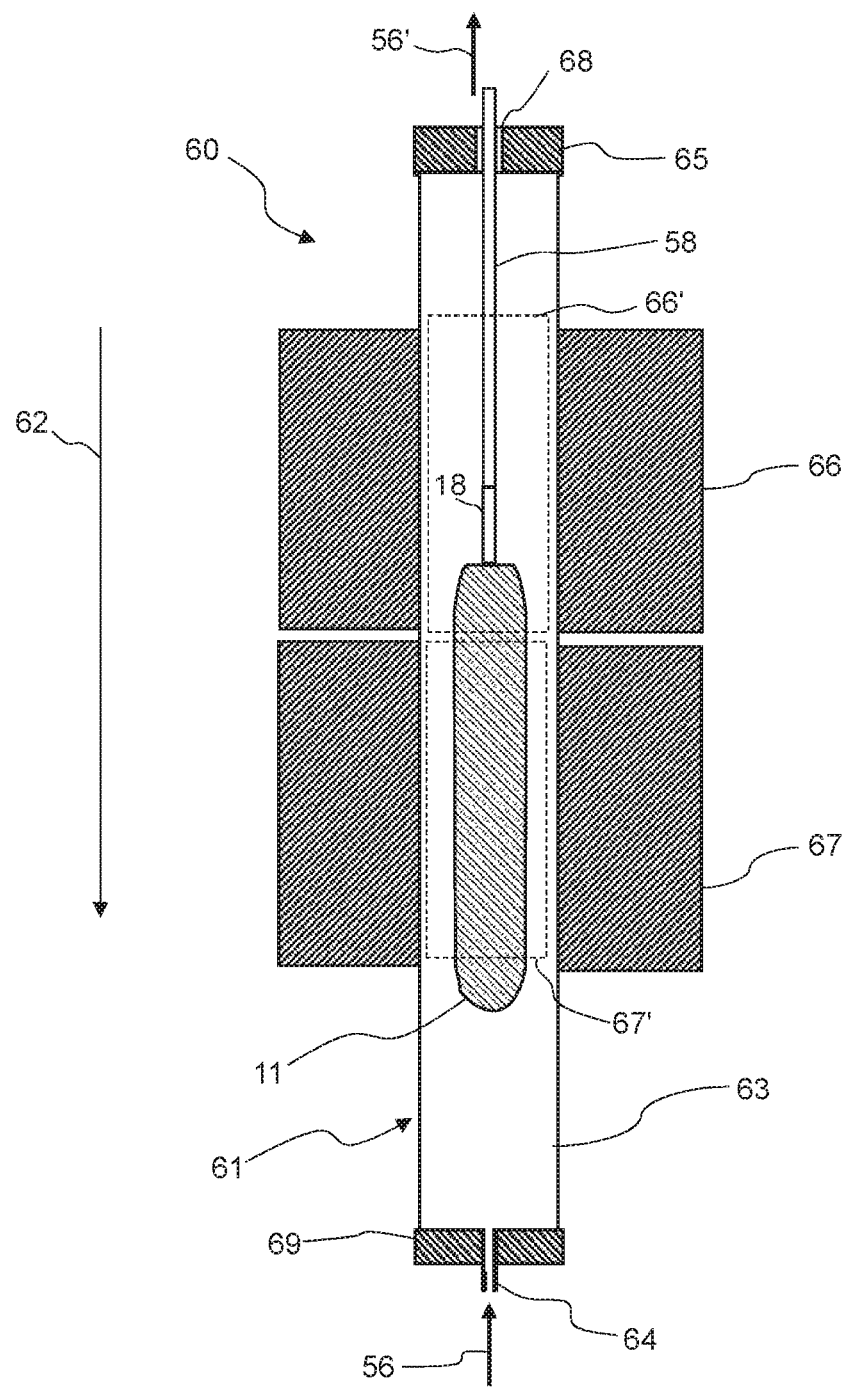
FIG. 4 is a schematic side view of a furnace for dehydration and consolidation of a fluorine-doped soot preform.

FIG. 4 is a schematic side view of a furnace for dehydration and consolidation of the fluorine-doped soot preform, according to an exemplary embodiment. A furnace 60, which may be of the type shown in FIG. 1, comprises an elongated chamber 61 (the second elongated chamber) extending vertically along a longitudinal direction (arrow 62). The elongated chamber is configured to house a preform and to allow a vertical movement (e.g. upward and downward) inside the elongated chamber.

Typically, the elongated chamber 61 is a muffle tube of cylindrical shape. The muffle tube, typically made of quartz, is vertically oriented so that the furnace longitudinal axis 62 is parallel to a downfeed direction for the translational movement of the preform along the muffle tube 61. The muffle tube 61 has a lateral wall 63. A basement 69 and a lid 65 close, respectively, the bottom and the top of the muffle tube 61.

The furnace 60 comprises an upper heater 66 arranged peripherally to the muffle tube 61, in particular surrounding the lateral wall 63 of the muffle tube 61. The upper heater 66 defines an upper hot zone 66', indicated in FIG. 4 with a dotted line, set at a dehydration temperature, $T_d$, suitable for dehydration of the porous layers of the fluorine-doped soot preform. A lower heater 67, which is positioned below the upper heater 66, defines a lower hot zone 67', indicated in FIG. 4 with a dotted line, set at a consolidation temperature for consolidation of the dehydrated fluorine-doped preform into a solid glass preform. The lower heater 67 is arranged peripherally to the muffle tube 61, in particular surrounding, the (cylindrical) lateral wall 63 of the muffle tube 61.

The fluorine-doped soot preform transferred from the first furnace is inserted in the muffle tube 61 and positioned at the upper hot zone 66' of the furnace 60. The upper hot zone extends along the longitudinal direction for a first longitudinal section of the muffle tube 61, corresponding to the length of the upper heater 66.

The furnace 60 is provided with a gas inlet port 64 for the supply of processing gases into the muffle tube 61 and a gas outlet port 68. In the configuration shown in the FIG. 4, gases are fed from the bottom of the muffle tube 61 through the gas inlet port 64 and discharged from the top through the gas outlet port 68. Gas inlet port 64 is provided as a through-hole in the basement 69 and gas outlet port 68 is provided as a through-hole in the lid 65. The gas inlet port 64 can be connected to the gas delivery system, for example via a duct (not shown). Inlet and outlet gas flows are symbolized with respective arrows 56, 56'. In the furnace 60 of FIG. 4, gases flow upwardly through the muffle tube 61 from the gas inlet port 64.

The upper hot zone 66' is set at a dehydration temperature $T_d$ that induces no sintering of the soot. The typical dehydration temperature is of from 1000° C. to 1350° C.

In the dehydration process, one or more drying gases including or consisting of chlorine, are fed in the furnace, typically together with an inert gas.

Dehydrating the fluorine-doped soot preform is carried out by exposing the soot preform to an atmosphere including a chlorine-containing gas and being substantially devoid of a fluorine-containing gas. Typically, fluorine concentrations during dehydration of the fluorine-doped soot preform are less than about 0.01 percent by volume. Typically, the atmosphere includes an inert gas, typically helium.

The fluorine-doped soot preform 11 may remain stationary in the upper hot zone 66' for dehydration and then is moved down toward the lower hot zone 67' for consolidation.

Subsequent to dehydration, the dried fluorine-doped soot preform is consolidated by subjecting the preform to a temperature higher than the glass transition temperature and sufficient to induce sintering of the porous preform into solid glass. To achieve consolidation, the fluorine-doped soot preform 11 is moved down toward the lower hot zone 67' positioned below the upper hot zone 66'. The heater 67 and thus the lower hot zone 67' is typically set at a consolidation temperature, $T_c$, of from 1500° C. to 1650° C.

In an exemplary embodiment, during dehydration the fluorine-doped soot preform 11 remains stationary, with respect to the longitudinal direction 62 (e.g., vertical), in correspondence to the upper hot zone 66', and typically rotates in order to ensure axial symmetry of the process.

The dried fluorine-doped soot preform 11 can be moved down to the lower hot zone 67' to remain stationary in that zone during the consolidation phase. Typically, the preform is gradually lowered through the lower hot zone until the whole preform has passed through that zone to be consolidated into glass preform. In this case, the preform is fully consolidated from the bottom to the top.

In another exemplary embodiment, dehydrating comprises gradually lowering the soot preform through the upper hot zone 66' so as to dehydrate the fluorine-doped soot preform, and consolidating comprises continuing to gradually lower the fluorine-doped soot preform into the lower hot zone 67' until the whole preform has passed through the lower hot zone.

In ways known per se, vertical movement along the muffle tube is realized by a translational downfeed system (not shown). Operative connection of the preform 11 to the translational downfeed system can be made by suspending the preform to a support handle 58 (only partly shown) of the translational downfeed system, the support handle being connected to the top portion of the preform handle 18.

Typically, the consolidation phase is carried out in an atmosphere substantially devoid of chlorine and fluorine. Typically, at the start of the consolidation phase the chlorine-containing gas is turned off, while keeping the inert gas flowing. Typically, fluorine concentrations during consolidation of the fluorine-doped soot preform are less than about 0.01 percent by volume.

In the embodiments in which the soot preform 11 is a core soot preform made by OVD or VAD, after the soot deposition process, the soot preform has a central longitudinal hole (not shown in the figures), which extends axially through the preform. Complete closure of the central longitudinal hole produces a glass core rod for a preform for an optical fiber. Closure of the central hole can be attained during or after consolidation of the glass core preform. Simultaneous consolidation of the soot core preform and closure of the preform's central longitudinal hole can be carried out by creating a vacuum in the central longitudinal hole. In this way, by passing through the consolidation hot zone 67', the dried, fluorine-doped soot preform shrinks radially (and axially) with simultaneous collapse of the central longitudinal hole. A simultaneous consolidation and closure of the central hole in a method of forming a glass core preform is described in International Publication No. WO 2017/059928.

Closure of the central longitudinal hole can be performed after consolidation of the dried, fluorine-doped soot core preform by redrawing and/or stretching the consolidated glass core preform, such as during a stretching process.

Subsequent to the consolidation of the core preform, the glass core preform is extracted from the muffle tube 61 and is subjected to a stretching process to reduce its outer diameter and to enhance straightness of the cylindrical rod. The stretching process can be carried out by a conventional stretching apparatus. The stretched core preform is severed into a plurality of core rods, each of the core rods constituting a central region of a final optical fiber preform.

Each core rod can be used as a substrate for an overcladding process, known per se. Typically, a soot overclad layer is formed by depositing soot material on the outer circumference of the core rod by a flame hydrolysis process. In an exemplary embodiment, the overcladding region is formed by an OVD process, in which the core rod is placed on a horizontal lathe and deposition of silica soot takes place outside the rotating preform until the desired amount of material, which is related to the desired thickness of overclad region, is grown around the core rod. Once the desired thickness of the soot overclad layer is achieved on the core rod, soot deposition for the formation of the soot overclad layer is terminated. Typically, the overclad region is made of pure silica.

The resulting partially porous soot preform is dried and sintered in a furnace, which can be a dehydration-consolidation furnace of the type described with reference to FIG. 4.

Consolidation produces a glass preform, which is to be drawn into an optical fiber. Following the formation of a glass optical fiber preform, the glass optical fiber preform is lowered at a relatively low speed into a drawing tower, including a furnace having a hot zone. There, the glass optical fiber preform is heated at a melting temperature (e.g., typically at a temperature of from 1900° C. to 2100° C.) in the neck-down region, where the glass softens, and the glass optical fiber preform is reduced in cross-sectional area to the desired cross-sectional area of the optical fiber. From the lower tip of the neck-down region, the optical fiber emerges, where it is gripped by a mechanical device and wound in one or more reels. Typical diameter of the single-mode fiber is of about 125 microns (μm).

EXAMPLES

Several soot core preforms were manufactured by an OVD process to obtain a step-index profile with a germanium-doped silica core region and an undoped silica near-clad region surrounding and in contact with the core region. Before OVD deposition, a hollow handle having an axial aperture was secured to an end of the mandrel and the opposite end of the mandrel was mounted on a lathe. The soot core preforms produced by the deposition were 1 meter long and had a central longitudinal hole after removal of the mandrel. The configuration of the preform handle allowed application of vacuum through the handle down to the central hole. The average weight of the soot core preforms was approximately 11 kilograms. Fluorine doping was aimed at the formation of a fluorine-doped region in the originally undoped near-clad region. The fluorine-doped region, referred to as trench region, had a negative relative refractive-index difference with respect to undoped silica.

The glass core rods were characterized with a commercial York P106 preform-analyzer to check the down-doped trench region in the refractive index profile. Outer radius of the glass core rod was 12.2 millimeters in all examples. FIGS. 5-8 are plots showing the measured refractive index profile of the trench region (arbitrary units) versus the core rod radius (r).

Example 1 (Comparative)

A soot core preform was inserted in a dehydration-consolidation furnace of the type described with reference to FIG. 4. A simultaneous dehydration and fluorine-doping phase was carried out by positioning the preform in the upper hot zone set at a temperature of 1000-1100° C., while the lower hot zone was set at a temperature of 1450° C. The soot core preform remained in the upper hot zone for 1.5 hours while rotating with a rotational speed of 5 turns/min and being exposed to an atmosphere of flowing gas mixture of 80 l/min He+1.5 l/min $Cl_2$+0.3 l/min $SF_6$.

The dehydrated and fluorine-doped soot core preform was then down driven at 4 mm/min toward the lower hot zone of the furnace set at a temperature of 1550° C. while rotating with a rotational speed of 1 turn/min in a helium flow of 20 l/min, until the whole preform had passed through the lower hot zone for consolidation. Upon starting the descent toward the lower hot zone, vacuum was created in the central longitudinal hole by inserting a vacuum duct into an axial aperture of the hollow inner handle and by connecting the vacuum duct to a vacuum pump (details not shown in the figures).

The glass core preform obtained by this process was removed from the dehydration-consolidation furnace and then inserted into conventional stretching apparatus to obtain a stretched core preform. The stretched core preform was severed into a plurality of core rods. Each of the glass core rods was further processed according to a standard overcladding process to form a glass preform drawn to an optical fiber. Average values of optical attenuation measured in the optical fibers were 0.33 dB/km at 1310 nm, 0.28 dB/km at 1380 nm, and 0.19 dB/km at 1550 nm.

Figure 5:
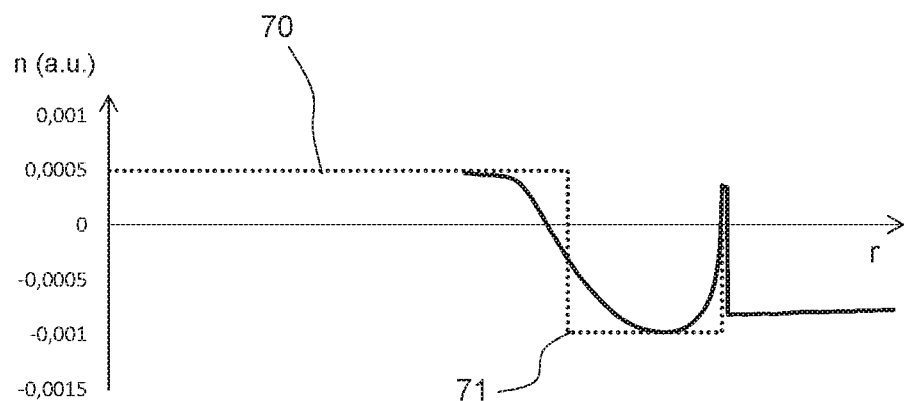
FIG. 5 shows a measured relative refractive index profile of a glass core rod produced according to an example described in the present application.

FIG. 5 shows a measured refractive index profile of the trench region of a core rod produced according to Example 1. Dotted line 70, shown also in following FIGS. 6-8, indicates the level of pure (undoped) silica, whereas dotted line 71 indicates the nominal maximum depth of the trench region.

After several processes (>50-70) according to the present example, an evident formation of pits, which is known to lead to a muffle failure, was observed on the lateral wall of the quartz muffle tube.

Example 2 (Comparative)

A soot core preform was inserted in a dehydration-consolidation furnace of the type described with reference to FIG. 4. A simultaneous dehydration and fluorine-doping phase and then a simultaneous consolidation and closure of the central longitudinal were carried out as in Example 1, except for the processing time of the simultaneous dehydration and fluorine-doping phase, which was 4.5 hours.

Average values of optical attenuation were the same as those of Example 1.

Figure 6:
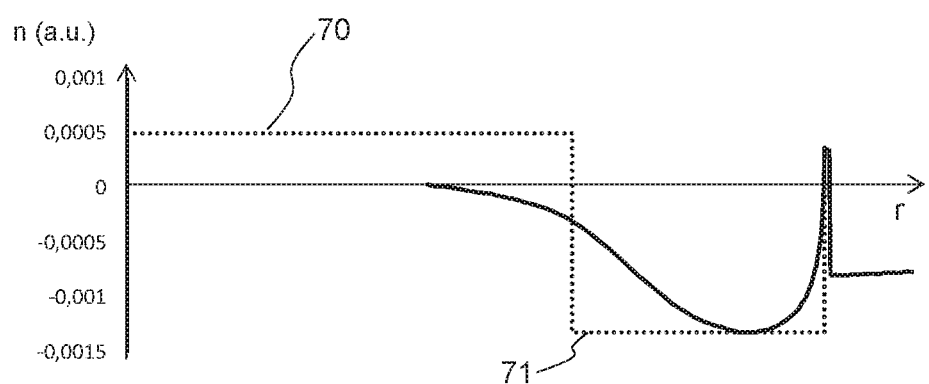
FIG. 6 shows a measured relative refractive index profile of a glass core rod produced according to a further example described in the present application.

FIG. 6 shows a measured refractive index profile of trench region of a core rod produced according to Example 2. A longer processing time of fluorine-doping combined with dehydration produced a wider trench region in the near-clad region.

Since the doping phase was three times longer (3X) than that of Example 1, an even more evident formation of pits was observed to occur on the muffle tube.

Example 3

A soot core preform was inserted in a first muffle tube of a first furnace of the type shown in FIG. 2, having a single hot zone. A fluorine-doping phase was carried out by positioning the soot core preform in the single hot zone set at a temperature of 1000° C. The soot core preform remained in the single hot zone for doping time of 1 hour while rotating with a rotational speed of 5 turns/min and being exposed to an atmosphere of flowing helium at flow rate of 20 l/min and $SF_6$ at 0.3 l/min. The flow of $SF_6$ was then stopped and the preform was maintained in the muffle tube of the furnace for 1 hour to let exhaust fluorine containing gases.

Subsequently, the fluorine-doped soot preform was removed from the first furnace and inserted into a second muffle tube of a second furnace, which was a standard dehydration-consolidation furnace of the type shown in FIG. 4. The second furnace was the same as the furnace employed in the comparative examples but equipped with a new quartz muffle.

A dehydration phase was carried out by positioning the fluorine-doped soot preform in the upper hot zone of the second furnace set at a temperature of 1100° C. The preform remained in the upper hot zone for a dehydration time of 4.5 hours while rotating with a rotational speed of 1 turns/min and being exposed to an atmosphere of flowing gas mixture of 80 l/min He+1.5 l/min $Cl_2$ (no fluorine).

The dehydrated fluorine-doped soot core preform was then down driven at 4 mm/min toward the lower hot zone of the second furnace set at a temperature of 1550° C. while rotating with a rotational speed of 1 turn/min in a helium flow having flow rate of 20 l/min (no chlorine or fluorine) until the whole preform had passed through the lower hot zone for consolidation. Upon starting the descent toward the lower hot zone, vacuum was created in the central longitudinal hole, such as described in Example 1.

The glass core preform obtained by this process was removed from the dehydration-consolidation furnace and then inserted into a conventional stretching apparatus to obtain a stretched core preform. The stretched core preform was severed into a plurality of glass core rods.

Figure 7:
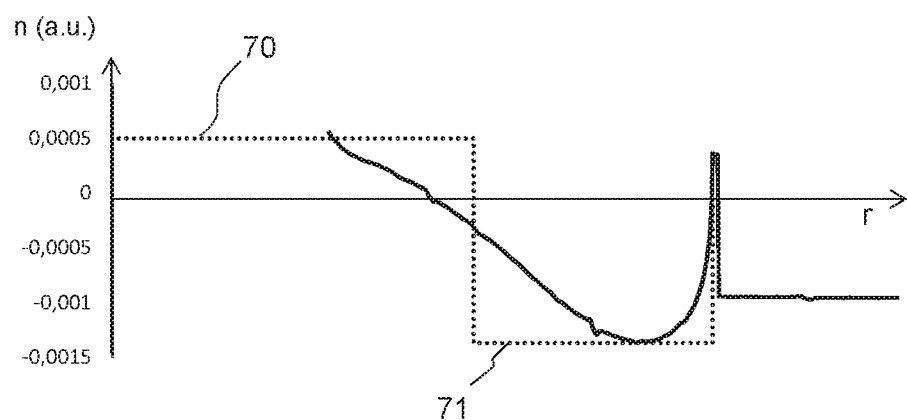
FIG. 7 shows a measured relative refractive index profile of a glass core rod produced according to a still further example described in the present application.

FIG. 7 shows a measured refractive index profile of the trench region of a core rod produced according to Example 3.

It is noted that the trench width of the refractive index profiles of Example 3 is similar to the trench width for comparative Example 2, despite the doping time for fluorine doping in Example 3 being much shorter than that of comparative Example 2. When comparing Example 3 with Example 1, a similar yet shorter doping time in Example 3 resulted in a wider and deeper trench. This very likely indicates a more efficient diffusion of fluorine across the near-clad region of the soot core preform for the method according to this exemplary embodiment consistent with the present disclosure.

Each of the glass core rods was further processed according to a standard overcladding process to form a glass preform drawn to an optical fiber.

Average values of optical attenuation were the same as those of comparative Example 1, indicating that the removal of the soot preform in ambient air after fluorine-doping and its transfer to the second furnace did not significantly affect the final optical attenuation.

Example 4

A fluorine-doping phase followed by dehydration and consolidation phases were carried out as in Example 3 using the same first and second furnaces, except for the doping time of the fluorination doping phase, which was reduced from 1 hour to 30 minutes.

Figure 8:
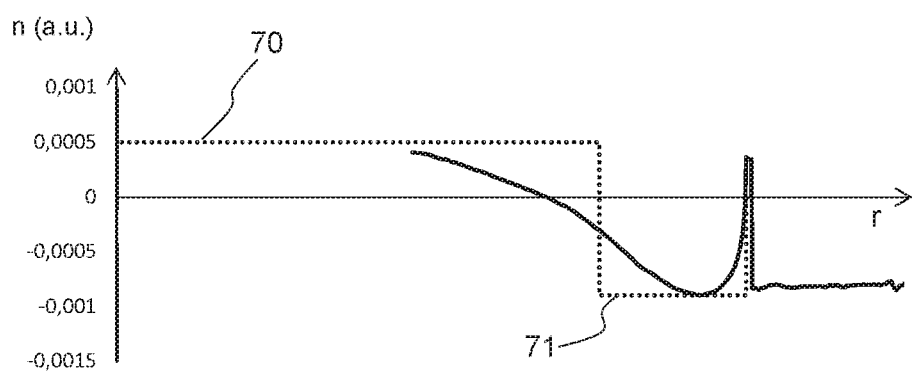
FIG. 8 shows a measured relative refractive index profile of a glass core rod produced according to a still further example described in the present application.

FIG. 8 shows a measured refractive index profile of the trench region of a core rod produced according to Example 4. When comparing Example 4 with comparative Example 1, the trench width and depth are similar, despite the doping time in Example 4 being one third of the doping time used in Example 1, again indicative of a more efficient fluorine diffusion process across the soot preform in the first case.

Each of the rods was further processed as in previous examples to obtain optical fibers. Average values of optical attenuation measured in the optical fibers were the same as those of comparative Example 1.

Other Aspects and Embodiments

The foregoing detailed description and accompanying figures set forth typical embodiments of methods for manufacturing fluorine-doped glass preforms for optical fibers. The present disclosure is not limited to such exemplary embodiments. It will be apparent that numerous other process embodiments may be provided in accordance with the present disclosure. The present disclosure may utilize any variety of aspects, features, or steps, or combinations thereof. The figures may be schematic representations that are not necessarily drawn to scale.

It is within the scope of this disclosure for one or more of the terms "substantially," "about," "approximately," and/or the like, to qualify each adjective and adverb of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

While various aspects, features, and embodiments have been disclosed herein, other aspects, features, and embodiments will be apparent to those having ordinary skill in the art. The various disclosed aspects, features, and embodiments are for purposes of illustration and are not intended to be limiting. Those having ordinary skill in the art will recognize that it is possible to combine the various features of the embodiments described (above) in order to obtain further embodiments, all of which are in any case encompassed by the present disclosure as defined by the claims. In this regard, it is intended that the scope of the present invention includes at least the following claims and their equivalents:

The invention claimed is:

1. A method for manufacturing a fluorine-doped glass preform for optical fibers, the method comprising:
   exposing a soot preform to an atmosphere containing a fluorine-containing gas in a first elongated chamber of a first furnace, the first elongated chamber having a single isothermal hot zone kept at a doping temperature of from 800° C. to 1200° C. to obtain a fluorine-doped soot preform;
   dehydrating the fluorine-doped soot preform by exposing it to an atmosphere containing a chlorine-containing gas and being substantially devoid of fluorine in a second elongated chamber of a second furnace, the second elongated chamber having an upper hot zone at a dehydration temperature of from 1000° C. to 1350° C. and a lower hot zone at a consolidation temperature of from 1500° C. to 1650° C., wherein dehydration takes place in the upper hot zone of the second furnace; and
   consolidating the fluorine-doped soot preform by moving it down into the lower hot zone of the second furnace so as to form a fluorine-doped glass preform.

2. The method according to claim 1, wherein, during exposure of the soot preform to an atmosphere containing a fluorine-containing gas, the soot preform is maintained at the doping temperature for a doping time between 20 minutes and 120 minutes.

3. The method according to claim 1, comprising, after exposing the soot preform to an atmosphere containing a fluorine-containing gas and before dehydrating the fluorine-doped soot preform, transferring the fluorine-doped soot preform into the second elongated chamber and positioning the fluorine-doped soot preform in the upper hot zone of the second elongated chamber.

4. The method according to claim 1, wherein the first elongated chamber extends in a vertical direction, the soot preform has a preform length and the single isothermal zone has a length equal to or larger than the preform length so that the whole soot preform is isothermally heated at the doping temperature while exposing the soot preform to an atmosphere containing a fluorine-containing gas.

5. The method according to claim 1, wherein the fluorine-containing gas is a fluorocarbon gas and/or a sulfur/sulfuryl fluoride gas.

6. The method according to claim 1, wherein the first elongated chamber is a first muffle tube of generally cylindrical shape arranged vertically and the first furnace comprises a heater arranged peripherally to the first muffle tube, the heater defining the single isothermal zone.

7. The method according to claim 6, wherein
the first furnace comprises a gas inlet port positioned above the heater and an inner pipe having an inlet end opening and an outlet end opening, the inner pipe being fluidly connected to the gas inlet port through its inlet end opening,
wherein the inner pipe extends vertically downward inside the first muffle tube for guiding an inlet gas flow to a lower portion of the first muffle tube, and
wherein exposing a soot preform to an atmosphere containing a fluorine-containing gas comprises feeding the fluorine-containing gas into an inlet pipe through the gas inlet port to the outlet end opening for the outlet gas flow.

8. The method according to claim 7, wherein the heater extends vertically for a heater length (L) and the inner pipe extends vertically at least throughout the heater length (L).

9. The method according to claim 8, wherein the inner pipe extends downward from the heater so that the outlet end opening of the inner pipe is vertically positioned lower than the heater.

10. The method according to claim 1, wherein the second elongated chamber of the second furnace is a second muffle tube of generally cylindrical shape arranged vertically and the second furnace comprises an upper heater defining the upper hot zone and a lower heater defining the lower hot zone, wherein the lower heater is positioned below the upper heater and the upper heater and the lower heater are arranged peripherally to the second muffle tube.

11. A method for manufacturing a fluorine-doped glass preform for optical fibers, the method comprising:
exposing a soot preform to an atmosphere containing a fluorine-containing gas in a first elongated chamber of a first furnace, the first elongated chamber having an isothermal hot zone maintained at a doping temperature between 800° C. and 1200° C. to obtain a fluorine-doped soot preform;
dehydrating the fluorine-doped soot preform by exposing it to an atmosphere containing a chlorine-containing gas in a second elongated chamber of a second furnace, the second elongated chamber having a dehydration hot zone maintained at a dehydration temperature and a consolidation hot zone maintained at a consolidation temperature, wherein dehydration takes place in the dehydration hot zone of the second furnace, wherein the consolidation temperature of the consolidation hot zone is greater than the dehydration temperature of the dehydration hot zone; and
consolidating the fluorine-doped soot preform by positioning it within the consolidation hot zone of the second furnace so as to form a fluorine-doped glass preform.

12. The method according to claim 11, comprising transferring the fluorine-doped soot preform into the second elongated chamber of the second furnace and positioning the fluorine-doped soot preform in the dehydration hot zone of the second elongated chamber of the second furnace.

13. The method according to claim 11, wherein, during dehydration of the fluorine-doped soot preform, the dehydration hot zone is maintained at a dehydration temperature between 1000° C. and 1350° C.

14. The method according to claim 11, wherein, during consolidation of the fluorine-doped soot preform, the consolidation hot zone is maintained at a consolidation temperature between 1500° C. and 1650° C.

15. The method according to claim 11, wherein, during fluorine-doping of the soot preform, fluorine-containing gas is fed into the first elongated chamber of the first furnace to achieve an atmosphere that contains a fluorine-containing gas but that is substantially devoid of chlorine.

16. The method according to claim 11, wherein, during dehydration and/or consolidation of the fluorine-doped soot preform, chlorine-containing gas is fed into the second elongated chamber of the second furnace to achieve an atmosphere that contains a chlorine-containing gas but that is substantially devoid of fluorine.

17. The method according to claim 11, wherein, during dehydration and consolidation of the fluorine-doped soot preform, the atmosphere within the second elongated chamber of the second furnace is less than 0.01 volume-percent fluorine.

18. The method according to claim 11, wherein the fluorine-doped soot preform is consolidated in an atmosphere substantially devoid of both chlorine and fluorine.

19. A method for manufacturing a fluorine-doped glass preform for optical fibers, the method comprising:
(i) exposing a soot preform to an atmosphere containing a fluorine-containing gas and being substantially devoid of chlorine in a first elongated chamber of a first furnace, the first elongated chamber having a single isothermal hot zone maintained at a doping temperature between 800° C. and 1200° C. to obtain a fluorine-doped soot preform,
wherein the first elongated chamber is a first muffle tube of generally cylindrical shape arranged vertically and the first furnace comprises a heater arranged peripherally to the first muffle tube, the heater defining the single isothermal zone,
wherein the first furnace comprises a gas inlet port positioned above the heater and an inner pipe having an inlet end opening and an outlet end opening, the inner pipe being fluidly connected to the gas inlet port through its inlet end opening,
wherein the inner pipe extends vertically downward inside the first muffle tube for guiding an inlet gas flow to a lower portion of the first muffle tube, and
wherein exposing a soot preform to an atmosphere containing a fluorine-containing gas comprises feeding the fluorine-containing gas into an inlet pipe through the gas inlet port to the outlet end opening for the outlet gas flow;
(ii) dehydrating the fluorine-doped soot preform by exposing it to an atmosphere containing a chlorine-containing gas and being substantially devoid of fluorine in a second elongated chamber of a second furnace, the second elongated chamber having an upper hot zone maintained at a dehydration temperature between 1000° C. and 1350° C. and a lower hot zone maintained at a consolidation temperature between 1500° C. and 1650° C., wherein dehydration takes place in the upper hot zone of the second furnace; and
(iii) consolidating the fluorine-doped soot preform by moving it into the lower hot zone of the second furnace to form a fluorine-doped glass preform.

20. The method according to claim 19, wherein the second elongated chamber of the second furnace is a second muffle tube of generally cylindrical shape arranged vertically and the second furnace comprises an upper heater defining the upper hot zone and a lower heater defining the lower hot zone, wherein the lower heater is positioned below the upper heater and the upper heater and the lower heater are arranged peripherally to the second muffle tube.

\* \* \* \* \*